(12) United States Patent
McCann

(10) Patent No.: US 6,270,168 B1
(45) Date of Patent: Aug. 7, 2001

(54) PNEUMATICALLY-OPERATED BRAKING SYSTEM FOR TRACTOR-TRAILER COMBINATIONS

(75) Inventor: Denis John McCann, Powys (GB)

(73) Assignee: Meritor Heavy Vehicle Systems, L.L.C., Troy, MI (US)

( * ) Notice: Subject to any disclaimer, the term of this patent is extended or adjusted under 35 U.S.C. 154(b) by 0 days.

(21) Appl. No.: 09/355,644

(22) PCT Filed: Jan. 27, 1998

(86) PCT No.: PCT/GB98/00233

§ 371 Date: Feb. 1, 2000

§ 102(e) Date: Feb. 1, 2000

(87) PCT Pub. No.: WO98/32641

PCT Pub. Date: Jul. 30, 1998

(30) Foreign Application Priority Data

Jan. 29, 1997 (GB) .................................................... 9701772

(51) Int. Cl.⁷ .......................... B60T 11/32; B60T 15/18; B60T 15/54
(52) U.S. Cl. .................................. 303/77; 303/9; 303/81; 303/7
(58) Field of Search .................................. 303/7, 9, 3, 15, 303/28, 77, 78, 81, 86

(56) References Cited

U.S. PATENT DOCUMENTS 4,609,230 * 9/1986 McCann ................................. 303/52
4,643,491 * 2/1987 McCann et al. .......................... 303/7
4,784,444 * 11/1988 McCann et al. ......................... 303/28
4,907,843 * 3/1990 McCann et al. .......................... 303/7
5,002,343 * 3/1991 Brearley et al. .......................... 303/7
5,042,883 * 8/1991 McCann et al. .......................... 303/7

FOREIGN PATENT DOCUMENTS

| 0387004 | 9/1990 | (EP) | ................................. B60T/13/66 |
| 2310250 | * 4/1975 | (FR) | ......................................... 303/7 |
| 2280535 | 7/1975 | (FR) | ................................. B60T/13/28 |
| 2310250 | 5/1976 | (FR) | . |
| 2330575 | 11/1976 | (FR) | ................................. B60T/13/28 |
| 2146719 | * 8/1984 | (GB) | ......................................... 303/7 |

OTHER PUBLICATIONS

International Search Report dated May 19, 1998.

* cited by examiner

Primary Examiner—Robert J. Oberleitner
Assistant Examiner—Devon Kramer
(74) Attorney, Agent, or Firm—Carlson, Gaskey & Olds, P.C.

(57) ABSTRACT

A pneumatically-operated braking system for a tractor-trailer combination incorporates a trailer control valve (4) for providing braking pressure for the trailer. The control valve (4) is adapted to be actuated by a pressure differential acting across it to limit the flow of air in the supply line (2) when a leak is present in the trailer control line (12), and the pressure differential is generated between the pressure in the supply line (2) and pressure supply from another independent source (1).

13 Claims, 1 Drawing Sheet

PNEUMATICALLY-OPERATED BRAKING SYSTEM FOR TRACTOR-TRAILER COMBINATIONS

Figure 1:
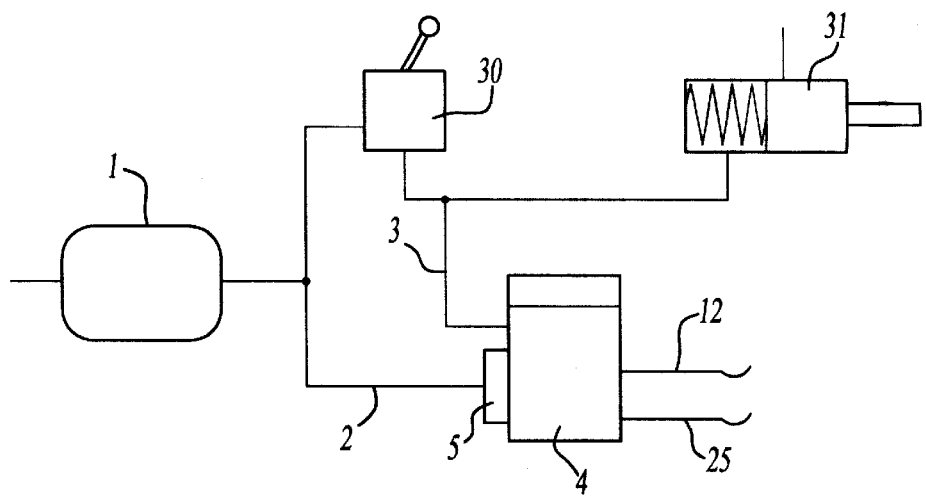

This invention relates to pneumatically-operated braking systems for vehicles and in particular to systems of the kind for use in tractor-trailer combinations.

Known pneumatically-operated braking systems for tractor-trailer combinations embody a safety feature, typically called a "supply dump valve", that is operative to limit the loss of air pressure stored in an air reservoir of the vehicle should a pneumatic control line between the tractor and the trailer become ruptured or otherwise damaged. By restricting the loss of supply air the operation of the trailer emergency relay valve is brought about.

The supply dump valve itself can usually be integrated into the trailer control valve which is fitted to the tractor. A trailer control valve for controlling operation of the brakes on the trailer under the control of an electronic braking system (EBS) is usually connected to the trailer through flexible couplings otherwise known as "suzies". The supply dump valve acts substantially to bring about the operation of the trailer emergency relay valve, and hence the application of the trailer brakes.

Conventionally the supply dump valve comprises a differential pressure actuated valve. Thus when the pressures acting on opposite sides of the valve are in equilibrium, the valve remains in a fully open position supported or biased by a lightly loaded spring. Should a leak occur in the control coupling or other associated trailer pipe work, it can then be arranged such that the leak lowers the pressure on one side of the supply dump valve, thereby causing the valve to move into a restricting position.

Typically the pressures supplied to both sides of the supply dump valve are taken from the air supply line or port of the trailer valve through internal valve passages, This arrangement is satisfactory when the leak generated by a rupture down stream of the trailer valve is large, since a pressure differential is rapidly built up across the supply dump valve, generated by the internal impedance within the trailer control valve, causing the supply dump valve to actuate.

It has been found, however, that if the leak rate is throttled, for example if the rupture is remote from the trailer control valve, then the internal impedance's within the valve is substantially masked and the pressures, on both sides of the supply dump valve fall at approximately equal rates. Thus the supply dump valve does not actuate.

We are aware of FR-A-2 310 250 which comprises the pre-characterising portion of claim 1.

According to our invention in a pneumatically-operated braking system for a tractor-trailer combination, a trailer control valve for providing braking pressure for a trailer is adapted to be actuated by a pressure differential acting across it to limit the flow of air to a trailer supply line when a leak is present in a trailer control line, and the pressure differential being generated between the pressure in the trailer control line and pressure supply from another independent source, and the independent source comprises the trailer/park pressure supply tank which is always unaffected by a leak downstream of the trailer control valve.

This ensures that should a leak occur in the trailer control line, sufficient pressure differential is generated across the supply dump valve always to ensure that it operates satisfactory since the supply dump valve will always, during non-park operation, have full tank pressure acting upon it.

During a park operation the vehicle is at rest and the air supplied to the actuators is removed. This causes brake actuators of the spring-actuating type, to clamp the wheels of the vehicle. In this condition the supply dump valve is not being fed with tank pressure since the respective line has been exhausted. This is of no consequence since the vehicle is in a parked condition. Once the park brake is removed, the supply dump valve is again provided with full trailerlpark tank pressure on one side, and full tractor supply line pressure on the other side. The supply dump valve is therefore held fully open until such time as a leak occurs in the trailer system.

Figure 2:
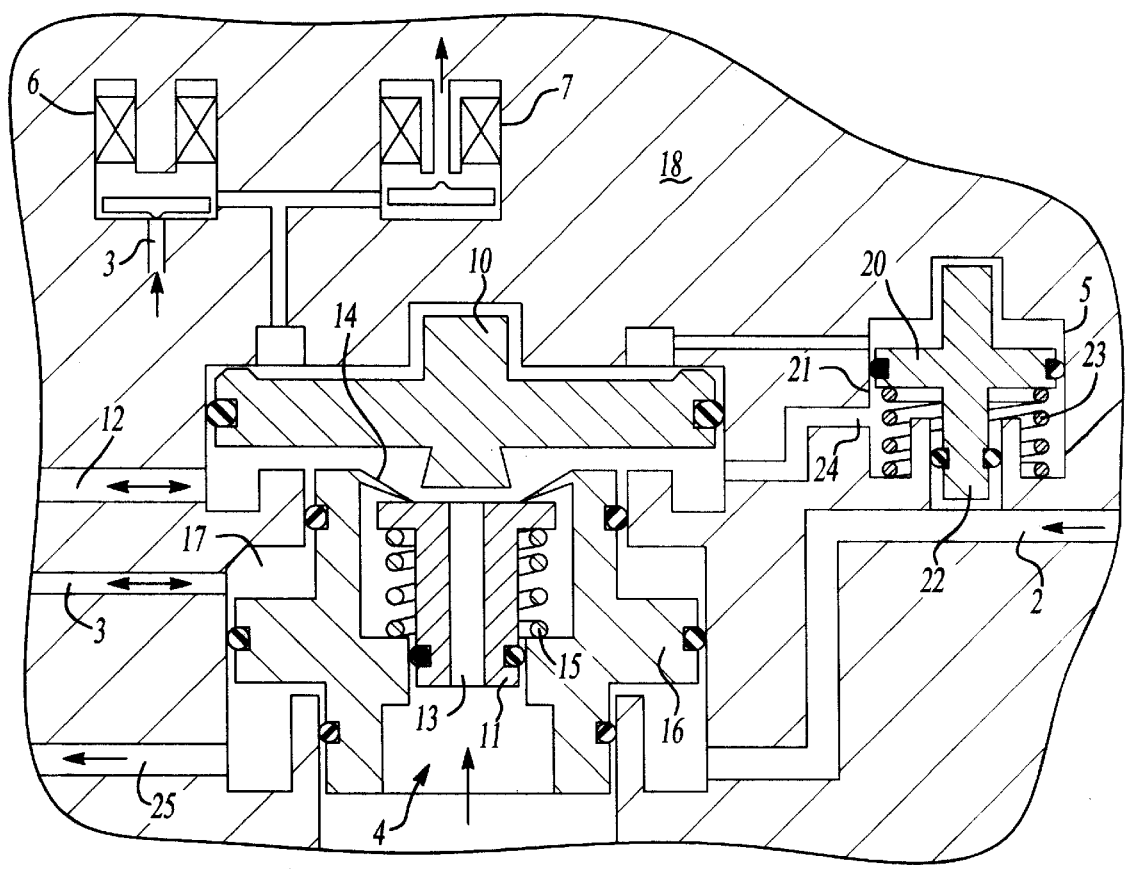

One embodiment of our invention is illustrated in the accompanying drawings in which:

FIG. 1 is a layout of a tractor-trailer braking system including an electronic trailer control valve; and FIG. 2 is a schematic view of the electronic trailer control valve incorporated in the system of FIG. 1.

The braking system illustrated in the accompanying drawings comprises a tank 1 of compressed air for operating the brakes of a trailer of a tractor-trailer combination from a supply 2. Control pressure to control elements of an electronically-operated control valve 4 which incorporates a supply dump valve 5, is supplied under the control of a parking brake valve 30 and through a line designated 3. The pressure from the line 3 is supplied to the control valve 4 through a normally closed solenoid-operated inlet valve 6 and a normally open solenoid-operated exhaust valve 7.

The control valve 4 comprises an upper control piston 10 subjected on its upper face to the control pressure 3 which, when operative, causes the piston 10 to move downwardly in order to co-operate with a brake-applying piston 11, in turn to isolate a control line 12 to the trailer from atmosphere by closing a central bore 13 in the piston 11. Further movement of the control piston 10 in the same direction unseats the upper end of the piston 11 from a valve seating 14 against the force in the spring 15. Pressure in the supply 2 is then supplied to the trailer control line 12 through communicating passages in the control valve 4 and past the valve seat 14.

The seating 14 is provided at the upper end of a sleeve 16 of stepped outline, and a parking chamber 17 is defined between a housing 18 in which the sleeve 16 is located and portions of the sleeve 16 which are of smaller and greater diameters.

The supply dump valve 5, which is shown in a simple form for illustration purposes, comprises a piston 20 working a bore 21 and subjected on its upper face to the control pressure 3 acting on the upper face of the piston 10. The piston 20 is carried by a rod 22 which is exposed at its outer end to pressure in the supply 2, and the area of the piston 20 comprising its lower face and on which acts a spring 23, is subjected to pressure in the control line 12.

Upon failure of the pressure supply acting on the lower face of the piston 20, the piston is urged downwardly against the force in the spring 23 in order to close a supply port leading to the control line 12.

The control pressure supply 3 for the normally closed solenoid-operated valve 6 is connected to the parking chamber 17 through an internal drilling (not shown).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The control pressure supply 3 is controlled by a park brake 30, in turn, to control operation of an actuator 31 of the spring brake type on a wheel of the tractor.

Upon making a brake application, the solenoid-operated exhaust valve 7 is closed, and the solenoid-operated inlet valve 6 is open. The upper face of the piston 10 is then subjected to the control pressure 3 and the piston 10 moves down to operate the brake-applying piston 11 as described above. When this occurs both sides of the piston 20 of the supply dump valve 5 are subjected substantially to equal pressures.

Should the pressure within the control line 12 fail, for example by failure of the control pneumatic coupling, or pipe work, the piston 20 will be urged downwardly against the force in the spring 23, due to a pressure drop occurring in the line 12. This restricts the supply port 2 and causes pressure in the trailer supply line 25 to escape to atmosphere, bringing about the operation of the trailer emergency relay valve. This is achieved since the pressure acting on the upper face of the piston 20 is less affected by the leak due to its connection with the chamber 17. This is due to the remoteness of the chamber 17 from any drop in internal valve pressure and the position of the tank 1, resulting in a more reliable operation of the supply dump valve.

When the vehicle is parked the air in the actuator 31, and hence in the chamber 17, is exhausted to atmosphere. This means that there is no longer any air supply for the normally-closed solenoid-operated valve 6. This is of no consequence since the vehicle is stationary and is parked by the brake being clamped against the wheel due to release of energy in the spring of the actuator 31.

What is claimed is:

1. A pneumatically-operated braking system for a tractor-trailer combination, in which a trailer control valve for providing braking pressure for the trailer is actuated by a pressure differential acting across it to limit the flow of air in a supply line when a leak is present in a trailer control line, the pressure differential being generated between the pressure in a trailer control line and pressure supply from a trailer/park pressure supply tank, the trailer control valve including a control piston subjected on one face to pressure in the control line which, when in operation, causes the control piston to cooperate with a brake-applying piston to isolate the trailer control line from atmosphere by closing a through bore in a brake-applying piston, further movement of the control piston in the same direction unseating the brake-applying piston from a valve seating to supply pressure to the trailer control line.

2. A braking system according to claim 1, in which the control valve incorporates a supply dump valve adapted to close the supply line upon failure of the control line.

3. A braking system according to claim 2, in which the dump valve comprises a dump piston working in a bore and subjected on one face to the pressure in the control line acting on a control piston, the control piston being carried by a control piston rod exposed to pressure in the supply line, and an opposite face of the dump piston on which acts a spring, being subjected to pressure in the control line.

4. A pneumatically-operated braking system comprising:
   an independent pressure supply tank having a supply pressure line therefrom; and
   a valve assembly having a dump valve attached to said supply pressure line, such that said supply dump valve substantially maintains a neutral position during normal application of said brake system, said valve assembly attached to a trailer control pressure line to restrict said supply pressure line in response to a failure of said trailer control pressure line;
   said valve assembly operable to restrict a flow associated with said supply pressure line in response to a pressure differential between said trailer control pressure line and said supply pressure line.

5. The system according to claim 4, wherein said valve assembly includes an electronically-operated control valve.

6. The system according to claim 5, wherein said electronically-operated control valve includes a control piston actuatable by a control pressure, said control piston operable to close a through bore of a brake-applying piston to restrict said trailer control pressure line.

7. The system according to claim 6, wherein said control piston disengages said brake-applying piston from a valve seat to increase pressure in said trailer control pressure line in response to a pressure increase in said control pressure line.

8. The system according to claim 6, wherein said supply dump valve restricts said supply pressure line in response to a pressure differential between said supply pressure line and said trailer control pressure line.

9. A method of limiting a supply pressure for a pneumatically-operated braking system having a valve assembly associated with a supply pressure line and a trailer control pressure line comprising the steps of:
   (1) supplying a supply pressure to the valve assembly from an independent supply tank;
   (2) supplying a control pressure to said valve assembly;
   (3) determining whether a pressure differential exists between said trailer control pressure line and said supply pressure line; and
   (4) restricting a flow associated with said supply pressure line in response to determining that said pressure differential exists and exhausting a trailer supply line to atmosphere.

10. A method as recited in claim 9, further comprising the step of restricting said supply pressure line flow in response to detecting a failure of said trailer control pressure line.

11. A pneumatically-operated braking system for a tractor-trailer combination comprising:
   a trailer control valve for providing braking pressure for the trailer actuated by a pressure differential acting across said valve to limit the flow of air in a supply line when a leak is present in a trailer control line, the pressure differential being generated between the pressure in a trailer control line and pressure supply from a trailer/park pressure supply tank,
   said trailer control valve including a control piston subjected on one face to pressure in the control line which, when in operation, cause the piston to cooperate with a brake-applying piston to isolate the trailer control line from atmosphere by closing a through bore in a brake-applying piston, further movement of the control piston against a spring loading unseating the brake-applying piston from a valve seating to supply pressure to the trailer control line.

12. A pneumatically-operated braking system comprising:
   an independent pressure supply tank having a supply pressure line therefrom; and
   a valve assembly having a supply dump valve and a control valve, said supply dump valve attached to said supply pressure line such that said supply dump valve substantially maintains a neutral position during normal application of said brake system and a control valve attached to a trailer control pressure line;

said valve assembly operable to restrict a flow associated with said supply pressure line in response to a pressure differential between said trailer control pressure line and said supply pressure line.

13. A method of limiting a supply pressure for a pneumatically-operated braking system having a valve assembly associated with a supply pressure line and a trailer control pressure line comprising the steps of:

(1) supplying a supply pressure to the valve assembly from an independent supply tank;

(2) supplying a control pressure to said valve assembly;

(3) determining whether a pressure differential exists between said trailer control pressure line and said supply pressure line; and (4) restricting a flow associated with said supply pressure line and exhausting the trailer supply line to atmosphere in response to determining that said pressure differential exists.

* * * * *